UNITED STATES PATENT OFFICE.

BERTRAM HUNT, OF CRIPPLE CREEK, COLORADO.

PROCESS OF REFINING GOLD AND SILVER BULLION.

SPECIFICATION forming part of Letters Patent No. 571,369, dated November 17, 1896.

Application filed September 10, 1896. Serial No. 605,425. (No specimens.)

*To all whom it may concern:*

Be it known that I, BERTRAM HUNT, a subject of the Queen of Great Britain and Ireland, residing in Cripple Creek, county of El Paso, and State of Colorado, have invented certain new and useful Improvements in the Refining of Gold and Silver Bullion or Slimes Containing Base Metals; and I do hereby declare that the following is a full, clear, and exact description of the invention, which will enable others skilled in the art to which it appertains to use the same.

This invention relates to the partial or complete removal of base metals from gold and silver. It is specially applicable to the purification or refining of "bullion slimes" produced in the "cyanid" process of gold and silver extraction. Many attempts have been made to refine these slimes by direct treatment with sulfuric or hydrochloric acid, but with only partial success, for the following reasons: Many of the cyanid compounds existing in these slimes are not decomposed even by strong acids, and therefore remain insoluble, and the base metals are found alloyed with the gold and silver after melting. Further, hydrochloric acid forms insoluble lead chlorid with any lead present, and sulfuric acid forms insoluble sulfates of lead and calcium. These insoluble sulfates produce much "matte" in melting the bullion, which is difficult to remove without reducing the "fineness" of the bullion. Metallic copper, which frequently occurs in the slimes, is very slowly attacked by these two acids.

I have found that all cyanid compounds in the slimes are very easily decomposed by roasting and that the oxids of the base metals formed by the roasting are readily and completely soluble in nitric acid.

I prefer to operate my invention in the following manner: The slimes as taken from the "zinc boxes" are dried and carefully roasted, (in an iron pan or in a muffle,) so as to completely decompose all cyanogen compounds. The roasted slimes are then treated with dilute nitric acid of ten (10) to twenty (20) per cent. strength. The acid is contained in a suitable vessel, such as is used for the "parting" of gold and silver, and is kept at boiling heat until the solution of the base metals is effected. In many cases this treatment will be sufficient, and after thorough washing with pure water the powder of gold may be melted and run into a bar. In the presence of silver a further treatment with strong nitric acid is given, which will dissolve out the silver, the gold-powder being thoroughly washed as before. The silver, if any, contained in the slimes is now in solution as nitrate of silver and can be precipitated and recovered by well-known means. If any silver remains with the gold, it can be removed during the smelting of the bullion by well-known means.

By this invention fine gold and fine silver can be produced direct from the slimes before they have been smelted.

I do not claim any special apparatus.

What I claim, and desire to secure by Letters Patent, is—

The process of refining bullion-slimes by first roasting the slimes to decompose all cyanogen compounds and carbonaceous matters and then treating the roasted slimes with nitric acid, substantially as described.

In witness whereof I have hereto signed my name, in the presence of two subscribing witnesses, this 5th day of September, 1896.

BERTRAM HUNT.

Witnesses:
PAUL REVERE FORBES,
JOHN FRASER.